United States Patent [19]

Aoyama et al.

[11] Patent Number: 6,083,617
[45] Date of Patent: *Jul. 4, 2000

[54] POLYESTER COMPOSITION AND FILMS PRODUCED THEREFROM

[75] Inventors: Masatoshi Aoyama, Otsu; Hiroji Kojima, Takatsuki; Masaru Suzuki, Ito, all of Japan

[73] Assignee: Toray Industries, Inc., Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/750,576

[22] PCT Filed: Apr. 11, 1996

[86] PCT No.: PCT/JP96/00992

§ 371 Date: Dec. 11, 1996

§ 102(e) Date: Dec. 11, 1996

[87] PCT Pub. No.: WO96/32443

PCT Pub. Date: Oct. 17, 1996

[30] Foreign Application Priority Data

Apr. 13, 1995 [JP] Japan .................................. 7-088300

[51] Int. Cl.$^7$ .......................... B32B 27/18; B32B 27/20; B32B 27/36
[52] U.S. Cl. .......................... 428/327; 428/328; 428/329; 428/330; 428/331; 428/338; 428/339; 428/404; 428/480; 428/694.57; 428/694 SG; 428/910; 524/444; 524/450; 524/493; 423/700; 423/701; 423/709
[58] Field of Search ...................... 428/480, 910, 428/327, 328, 329, 330, 331, 694 ST, 694 SL, 694 SG; 423/700, 704, 705, 709, 712, 716, 718

[56] References Cited

U.S. PATENT DOCUMENTS

| | | | |
|---|---|---|---|
| 4,818,581 | 4/1989 | Katoh et al. | 428/143 |
| 4,990,400 | 2/1991 | Endo et al. | 428/331 |
| 5,006,589 | 4/1991 | Sakamoto et al. | 524/430 |
| 5,106,681 | 4/1992 | Endo et al. | 428/323 |
| 5,364,698 | 11/1994 | Kotani | 428/323 |
| 5,441,800 | 8/1995 | Utsumi | 428/323 |
| 5,494,739 | 2/1996 | Chuujou et al. | 428/323 |
| 5,498,454 | 3/1996 | Kuze et al. | 428/35.9 |

FOREIGN PATENT DOCUMENTS

| | | |
|---|---|---|
| 3 6003283A | 2/1985 | Japan . |
| 60-032836 | 2/1985 | Japan . |
| 3 62030146A | 2/1987 | Japan . |
| 62-030146 | 2/1987 | Japan . |
| 62-260834 | 11/1987 | Japan . |

*Primary Examiner*—Vivian Chen
*Attorney, Agent, or Firm*—Austin R. Miller

[57] ABSTRACT

A polyester composition comprising 0.005 to 10% by weight compound oxide particles having a volume average particle meter of 0.005 to 2 µm, a relative standard deviation σ of the particle diameter of not more than 0.3, and composed mainly of silicon (Si), aluminum (Al) and at least one alkali metal (M), wherein the contents of the silicon, aluminum and alkali metal satisfy the following requirements: 10 wt. % ≦ Si ≦ 45 wt. %, 3 wt. % ≦ Al ≦ 30 wt. % and 0.5 wt. % ≦ M ≦ 20 wt. %, respectively. The polyester composition, particularly when formed into films, has excellent surface evenness, running ability and abrasion resistance, and such films are suitable particularly for magnetic recording media and other applications.

43 Claims, No Drawings

POLYESTER COMPOSITION AND FILMS PRODUCED THEREFROM

TECHNICAL FIELD OF THE INVENTION

The present invention relates to a polyester composition and films produced therefrom. More specifically, the present invention relates to a polyester composition suitable for obtaining a film excellent in abrasion resistance, surface evenness, running ability and thermal resistance, and films produced therefrom.

BACKGROUND ART OF THE INVENTION

Generally, a thermoplastic polyester, for example, polyethylene terephthalate (PET), has excellent mechanical properties and chemical properties, and is used broadly as formed products such as films or fibers.

However, there is a problem that the productivity deteriorates by the poor running ability when a polyester is processed into formed products. As a method for improving such a problem, a method for dispersing particles in a polyester and providing protrusions on the surface of a formed product has been performed. Although this method is effective to solve the problem on running ability, abrasion resistance and scratch resistance of a formed product cannot be improved to satisfactory levels.

Further, in a case where a formed product, for example, a film for a magnetic tape, is low in abrasion resistance, powder abraded from the film is likely to be generated in a process for manufacturing the magnetic tape, missing of coating is liable to occur in a magnetic-layer coating process, and as a result, missing of magnetic recording (drop out) is liable to occur. In a case of using a magnetic tape, because the tape is run contact with various devices such as a recording•regenerating device in most cases, abraded powder caused by the contact adheres onto the magnetic tape, thereby causing missing of magnetic recording (drop out) at the time of recording or regenerating.

Namely, in a film for a magnetic tape, running ability and abrasion resistance are required both in a manufacturing process of a magnetic tape and in using as a magnetic tape.

To solve the above-described problems, a method for adding external particles (external particle method) and a method for precipitating particles by a residue of a catalyst (internally formed particle method) have been investigated. For example, as such an external particle method, JP-A-SHO 62-172031 (addition of silicone particles), JP-A-HEI 5-3377 (addition of spherical silica and calcium carbonate particles), JP-A-HEI 5-4412 (addition of spherical silica particles), JP-A-HEI 5-4413 (addition of spherical silica particles), and a method disclosed in JP-B-HEI 7-45576 are raised. However, the particles used in these methods are poor in affinity with PET, and they frequently fall off and cause trouble. Further, addition of specified aluminum silicate particles is proposed in JP-A-SHO 55-45118, JP-A-SHO 55-107495, JP-A-HEI 4-220447, JP-A-HEI 3-25451 and JP-A-HEI 6-329884. In the former two disclosures, however, the shape of the particles is undefined, there are many excessively large particles in the particle size distribution, and they are still insufficient in surface evenness and abrasion resistance. In the latter three disclosures, there remain some matters to be improved such as matters that the particle size distribution is broad and that the thermal resistance is low when formed into a polyester composition.

As for internally formed particle, methods disclosed in JP-A-SHO 34-5144 (containing an alkali metal salt), JP-A-SHO 40-3291 (containing a terephthalic salt), JP-A-SHO 48-61556 (containing lithium element) and JP-A-SHO 51-112860 (containing lithium element, calcium element and phosphorus element) are proposed. However, although it is known that these internally formed particles can make particular surface protrusions, the surface protrusions are relatively soft and are likely to be damaged as compared with external particle methods, and therefore, there are some matters to be improved in these methods.

Recently, higher quality has been required for uses as films, and a raw material for films having a higher function is desired to be developed. In products produced from the conventional raw materials, running ability and abrasion resistance are not sufficient, and a further improvement is required.

DISCLOSURE OF THE INVENTION

To solve the above-described problems in the conventional technologies, an object of the present invention is to provide a polyester composition excellent in running ability, surface evenness, abrasion resistance and thermal resistance when formed into films by containing specified particles in a polyester.

To accomplish this object, a polyester composition according to the present invention contains 0.005 to 10% by weight of compound oxide particles having a volume average particle diameter of 0.005 to 2 $\mu$m and composed mainly of silicon (Si), aluminium (Al) and at least one alkali metal (M), wherein the contents of the silicon, aluminium and alkali metal satisfy the following equations (1) to (3):

$$10 \text{ wt. \%} \leq Si \leq 45 \text{ wt. \%} \tag{1},$$

$$3 \text{ wt. \%} \leq Al \leq 30 \text{ wt. \%} \tag{2},$$

$$0.5 \text{ wt. \%} \leq M \leq 20 \text{ wt. \%} \tag{3}.$$

It also has a relative standard deviation "$\sigma$" of the particle diameter of said compound oxide particles represented by the following equation (4) is not more than 0.5:

$$\sigma = [\Sigma_{i=1}^{n}(Di-D)^2/n]^{(1/2)}/D \tag{4},$$

$$D = \Sigma_{i=1}^{n} Di/n \tag{5},$$

where $\sigma$: relative standard deviation of particle diameter

D: number average diameter of particles ($\mu$m)

Di: particle diameter ($\mu$m)

n: number of particles (number).

This polyester composition according to the present invention is excellent in forming ability as well as excellent in running ability, surface evenness, abrasion resistance and thermal resistance when formed into products such as films, and it can be appropriately employed for uses for, for example, magnetic recording media.

THE BEST MODE FOR CARRYING OUT THE INVENTION

A polyester in the polyester composition according to the present invention may be any polyester as long as it can be formed into films. For example, polyethylene terephthalate, polytetramethylene terephthalate, polycyclohexylene-dimethylene terephthalate, polyethylene-2,6-naphthalene dicarboxylate and polyethylene-1,2-bis(2-chlorophenoxy)

ethane-4,4'-dicarboxylate can be appropriately used, and among these, polyethylene terephthalate or polyethylene-2,6-naphthalene dicarboxylate is particularly preferred. In a case of use requiring, particularly, a mechanical strength, polyethylene-2,6-naphthalene dicarboxylate is preferred.

With these polyesters, a dicarboxylic acid such as adipic acid, isophthalic acid, sebacic acid, phthalic acid or 4,4'-diphenyldicarboxylic acid and ester forming derivatives thereof, a dioxy compound such as ethylene glycol, diethylene glycol, hexamethylene glycol, neopentyl glycol or polypropylene glycol, and oxycarboxylic acid such as p-(β-oxyethoxy)benzoic acid and ester forming derivatives thereof can be copolymerized. The amount of the copolymerization is desired to be preferably not more than 20 mol %, more preferably not more than 10 mol %, relative to all of polyester repeated units, from the viewpoint of thermal stability and dimensional stability of polyester.

In the composition of the compound oxide particles according to the present invention, silicon (Si), aluminium (Al) and an alkali metal (M) satisfy the following requirements, respectively.

$$10 \text{ wt. }\% \leq Si \leq 45 \text{ wt. }\%$$

$$3 \text{ wt. }\% \leq Al \leq 30 \text{ wt. }\%$$

$$0.5 \text{ wt. }\% \leq M \leq 20 \text{ wt. }\%$$

More preferably, they satisfy the following requirements from the viewpoint of affinity with polyester.

$$15 \text{ wt. }\% \leq Si \leq 40 \text{ wt. }\%$$

$$5 \text{ wt. }\% \leq Al \leq 25 \text{ wt. }\%$$

$$0.5 \text{ wt. }\% \leq M \leq 15 \text{ wt. }\%$$

Particularly preferably, they satisfy the following requirements.

$$15 \text{ wt. }\% \leq Si \leq 35 \text{ wt. }\%$$

$$5 \text{ wt. }\% \leq Al \leq 25 \text{ wt. }\%$$

$$1 \text{ wt. }\% \leq M \leq 15 \text{ wt. }\%$$

Therefore, the compound oxide particles according to the present invention is composed mainly of the respective atoms of Si, Al and M within the above-described ranges and oxygen atoms.

A mole ratio (Al/M) of the aluminium atom to the alkali metal atom is preferably in the range of 0.8 to 1.2 from the viewpoint of thermal stability. The alkali metal is particularly preferred to be sodium from the viewpoint of control of particle size distribution and particle diameter of the particles.

Further, in order to further increase the thermal resistance of the polyester composition and the abrasion resistance of a formed product such as a film, a mole ratio (Si/Al) of the silicon atom to the aluminium atom is preferably in the range of 0.25 to 10, more preferably in the range of 2.8 to 5, particularly preferably in the range of 2.8 to 3.5. A mole ratio (M/Si) of the alkali metal atom to the silicon atom is preferably in the range of 0.24 to 0.4, more preferably in the range of 0.3 to 0.4.

A moisture content of such compound oxide particles is preferably in the following range from the viewpoint of dispersion stability of the particles.

$$0.1 \text{ wt. }\% \leq H_2O \leq 20 \text{ wt. }\%$$

Particularly, it is preferred to be in the following range.

$$1 \text{ wt. }\% \leq H_2O \leq 20 \text{ wt. }\%$$

The moisture content means water content evaporated when heated up to a temperature of 300° C. at an temperature elevational speed of 10° C./min.

In the polyester composition containing the compound oxide particles according to the present invention, if an index for thermal resistance (ΔIV) is less than 0.15, reduction of molecular weight when formed into products such as films is low, and such a condition is preferred. More preferably, it is less than 0.1. Where, the "ΔIV" indicates a reduced amount of intrinsic viscosity when the polyester composition is maintained in a nitrogen atmosphere at 300° C. for ten minutes. If the "ΔIV" is great, a film breakage is liable to occur because of reduction of molecular weight and the film formation becomes unstable, the strength and elastic modulus of a film obtained decrease, or there may occur a case where recycle use becomes impossible because of too lowered molecular weight.

Further, if a content of an alkaline earth metal in the compound oxide particles according to the present invention is not more than 0.1 mol %, the thermal resistance of the polyester composition becomes good and such a condition is preferred.

In the present invention, the volume average particle diameter of compound oxide particles is in the range of 0.005 to 2 μm, preferably in the range of 0.01 to 1 μm, from the viewpoint of running ability and abrasion resistance when formed into products such as films. The relative standard deviation "σ" of the particle size distribution is not more than 0.3, preferably not more than 0.15, from the viewpoint of surface evenness and abrasion resistance. If the volume average particle diameter of the particles is more than 2 μm, surface protrusions become too large and the particles are likely to be fallen off when a formed product runs. If less than 0.005 μm, sufficiently large protrusions cannot be obtained and the running ability decreases.

The compound oxide particles are preferably spherical from the viewpoint of running ability of products such as films. Particularly, the ratio of a long diameter to a short diameter (long diameter/short diameter) of the particles is preferably in the range of 1 to 1.2. Where, the long diameter and short diameter of a particle mean the maximum diameter and the minimum diameter, respectively, when the particle is observed.

The content of compound oxide particles relative to polyester is in the range of 0.005 to 10 wt. %. In particular, when the content is in the range of 0.01 to 3 wt. %, the running ability and the surface evenness are further improved. If the content is less than 0.005 wt. %, the abrasion resistance cannot be sufficiently indicated, and if the content is more than 10 wt. %, agglomeration of particles occurs, excessively large particles are generated and the surface roughness of a film is likely to be remarkably increased.

The compound oxide particles according to the present invention can be produced, for example, by the following method.

For example, the particles to be required can be produced by adding a silicate of an alkali metal, ammonium or an organic base and an aluminum compound soluble to an alkali to an alkali solution having a pH of not less than 10 simultaneously, and reacting them. In this method, in order to produce particles having a greater specific surface area, it is preferred that the reaction solution is prepared such that the mole ratio of silicon atom/aluminum atom is controlled in the range of 0.25 to 10.

In the present invention, the refractive index of the compound oxide particles is preferably in the range of 1.4 to 1.6, more preferably in the range of 1.45 to 1.52, from the viewpoint of transparency.

The particles may be multi-layer particles containing a compound oxide in the outermost layer. In such a case, if a method for producing the particles by performing a reaction after dispersing seed particles for the multi-layer particles in an alkali solution having a pH of not less than 10 is employed, because particles grow around cores formed by the seed particles, control of particle diameter and particle size distribution can be easily performed. As the seed particles, it is preferred that the relative standard deviation "σ" of the particles is not more than 0.5 and the ratio of long diameter/short diameter of the particles is in the range of 1 to 1.2, from the viewpoint of control of the particle size distribution of the compound oxide particles and control of particle shape thereof. Although the kind of the seed particles is not particularly restricted, for example, it is possible to use silica, alumina, zirconia, titanium oxide, tin oxide, antimony oxide, yttrium oxide, cerium oxide, indium oxide or iron oxide particles, etc. Particularly, silica particles are appropriately used because control of particle growth reaction is easy and a sharp particle size distribution can be easily obtained.

Further, in this case, the compound oxide layer is preferably in the range of 0.01 to 0.3 μm from the viewpoint of abrasion resistance, strength of particles, strength of surface protrusions and affinity with polyester, and more preferably in the range of 0.05 to 0.2 μm, particularly preferably in the range of 0.08 to 0.2 μm.

The specific surface area of compound oxide particles is preferably in a range satisfying the following equation from the viewpoint of affinity with polyester.

$$S \geq 3.5/Dw$$

Where,

Dw: volume average particle diameter (μm)

S: specific surface area (m$^2$/g)

Further, when the specific surface area less than 50 m$^2$/g, the dispersion property in polyester is good and such a condition is preferred, and preferably less than 40 m$^2$/g, more preferably less than 30 m$^2$/g.

As the strength of compound oxide particles, a strength when deformed by 10% ($S_{10}$) preferably satisfies the following equation from the viewpoint of abrasion resistance and strength of surface protrusions.

$$4.9 \times 10^7 \, Pa \leq S_{10} \leq 3.9 \times 10^8 \, Pa$$

More preferably, the following equation is satisfied.

$$9.8 \times 10^7 \, Pa \leq S_{10} \leq 2.4 \times 10^8 \, Pa$$

For such compound oxide particles, a surface treatment can be conducted within a range which does not obstruct the advantages according to the present invention. As an agent for the surface treatment, for example, an anionic surface active agent such as sodium dodecylbenzene sulfonate, sodium lauryl sulfate, sodium dialkylsulfo-succinate or formalin condensed salt of naphthalene sulfonic acid, a nonionic surface active agent such as polyoxynonylphenol ether, polyethylene glycol monostearate or sorbitane monostearate, a water-soluble synthetic polymer such as polyvinyl alcohol, polyvinyl pyrolidone or polyethylene glycol, a natural polymer such as gelatin or starch, a semisynthetic polymer such as carboxymethyl cellulose, or a phosphorus compound such as silane-based, titanium-based or zirconium-based coupling agent, phosphoric acid, phosphorous acid, phosphonic acid or derivatives thereof, can be used.

Further, in order to improve functional properties such as formability, transparency and electrostatic casting property, other compounds such as a wax, a modifier and a flame retarder may be added within a range which does not obstruct the advantages according to the present invention.

In the present invention, the compound oxide particles are substantially amorphous in consideration of affinity with polymer, hardness, surface formation of particles and affinity with polyester. "Substantially amorphous" means that an amorphous degree determined by, for example, X-ray diffraction is not less than 90%. If the compound oxide particles are crystalline or the amorphous degree is less than 90%, there is a case where the abrasion resistance is insufficient when formed into films. This is presumed because the affinity with polyester becomes insufficient. For example, since a mineral silicate such as kaoline and zeolite are crystalline, they are poor in abrasion resistance as compared with amorphous compound oxide particles.

Further, the following particles A and/or particles B can be used together except the compound oxide particles within a range which does not obstruct the advantages according to the present invention. The particles A preferably are particles having a volume average particle diameter in the range of 0.005 to 1 μm from the viewpoint of abrasion resistance, running stability and surface evenness, and more preferably in the range of 0.01 to 0.5 μm. Further, the particles A are preferably smaller than the compound oxide particles by a value of not less than 0.1 μm, from the viewpoint of abrasion resistance and surface evenness. Furthermore, it is preferred that the particles A have a specific surface area of not less than 10 m$^2$/g and a Moh's hardness of not less than 6, because the abrasion resistance can be further improved by such conditions.

The content of the particles A is preferably in the range of 0.005 to 3 wt. % relative to polyester, more preferably in the range of 0.01 to 2 wt. %, from the viewpoint of abrasion resistance and surface evenness. As such particles A, for example, silicon oxide, titanium oxide, zirconium oxide, aluminum oxide, spinel, iron oxide and carbon black particles can be used. Among these particles, particularly zirconium oxide or aluminum oxide particles are preferred from the viewpoint of affinity with polyester, abrasion resistance and dispersion stability.

On the other hand, the particles B preferably are particles having a volume average particle diameter in the range of 0.05 to 2 μm from the viewpoint of running stability and surface evenness. Further, a difference between the volume average particle diameters of particles B and compound oxide particles is preferably not less than 0.1 μm from the viewpoint of running stability and surface evenness, and a difference of not less than 0.2 μm is further preferred from the viewpoint of running stability. Particularly, it is preferred that the diameter of particles B is greater than that of compound oxide particles. Further, the particles B preferably have a Moh's hardness less than 4 because a better abrasion resistance can be obtained.

The content of the particles B is preferably in the range of 0.005 to 0.3 wt. % relative to polyester from the viewpoint of running stability and surface evenness. As such particles B, for example, inorganic particles such as talc, calcium sulfate, barium sulfate, calcium carbonate and zinc sulfide particles can be used, and among these particles, calcium carbonate particles are particularly preferred from the viewpoint of affinity with polyester, surface evenness and dispersion stability. Further, organic polymeric particles can be used except such inorganic particles. As such organic polymeric particles, any particles can be used as long as at least a part of the particles is insoluble to polyester. Further, as the material of such particles, although polyimide, polyamideimide, polymethylmethacrylate, formaldehyde resin, phenolic resin, crosslinked polystyrene, silicone resin and other various materials can be used, vinyl-based crosslinked polymeric particles are particularly preferred because they have a high thermal resistance and particles having a uniform particle size distribution can be easily obtained.

The vinyl-based crosslinked polymeric particles are particles of a copolymer composed of a monovinyl compound (I) having only one aliphatic unsaturated bond in the molecule and a compound (II) having two or more aliphatic unsaturated bonds in the molecule which is used as a crosslinking component. As examples of the compound (I) in the above copolymer, a monovinyl compound such as styrene, α-methylstyrene, fluorostyrene, vinyl pyridine or ethylvinylbenzene, a vinyl cyanide compound such as acrylonitrile or methacrylonitrile, an acrylate monomer such as methylacrylate, ethylacrylate, propylacrylate, octylacrylate, dodecylacrylate, hexadecylacrylate, glycidylacrylate or N,N'-dimethylaminoethylacrylate, a methacrylate monomer such as methylmethacrylate, ethylmethacrylate, propylmethacrylate, isopropylmethacrylate, butylmethacrylate, sec-butylmethacrylate, arylmethacrylate, phenylmethacrylate, benzylmethacrylate, 2-ethylhexylmethacrylate, 2-hydroxyethylmethacrylate, glycylmethacrylate or N,N'-dimethylaminoethylmethacrylate, a mono- or dicarboxylic acid and an acid anhydride of dicarboxylic acid such as acrylic acid, methacrylic acid, maleic acid or itaconic acid, or an amide based monomer such as acrylic amide or methacrylic amide can be used. Particularly, as the compound (I), styrene, ethylvinylbenzene or methylmethacrylate is preferably used from the viewpoint of thermal stability, crosslinking property and handling ability.

As examples of the compound (II), a divinylbenzene compound, or a polyfunctional acrylate or methacrylate such as ethylene glycol diacrylate, ethylene glycol dimethacrylate, polyethylene glycol diacrylate, polyethylene glycol dimethacrylate, 1,3-butylene glycol diacrylate, 1,3-butylene glycol dimethacrylate, trimethylolpropane triacrylate or trimethylolpropane trimethacrylate can be employed. Among these compounds (II), particularly divinylbenzene, ethylene glycol dimethacrylate or trimethylolpropane trimethacrylate is preferably used from the viewpoint of thermal stability, crosslinking property and handling ability.

As examples of the vinyl-based crosslinked polymeric particles having a preferred composition, crosslinked polymeric particles composed of divinylbenzene copolymer, ethylvinylbenzene-divinylbenzene copolymer, styrene-divinylbenzene copolymer, ethylene glycol dimethacrylate copolymer, styrene-ethylene glycol dimethacrylate copolymer or methylmethacrylate-divinylbenzene copolymer can be employed. However, the particles are not limited to these examples, for example, the particles may be composed by a three-component or more component system such as styrene-ethylvinylbenzene-divinylbenzene copolymer or styrene-ethylene glycol dimethacrylate-methylmethacrylate copolymer.

Such vinyl-based polymeric particles can be produced, for example, by mixing the compounds (I) and (II) and using the following processes such as emulsion polymerization.

(a) soap free polymerization process: i.e., process for polymerizing without an emulsifier or using a very small amount of an emulsifier (b) seed polymerization process for adding polymer particles in a polymerization system prior to emulsion polymerization and thereafter emulsion polymerizing (c) core shell polymerization process for emulsion polymerizing a part of a monomer component and polymerizing the residual monomer in the polymerization system (d) polymerization process by the "ugel stat" disclosed in JP-A-SHO 54-97582

(e) polymerization process using no swelling assistant in the process (d)

The organic polymeric particles are preferably particles having a thermal resistance of a thermal decomposition temperature measured by a thermobalance (a temperature for causing 10% loss in weight, in a nitrogen atmosphere, temperature elevation speed: 10° C./min.) of not lower than 350° C., because agglomeration of the particles hardly occur when a polyester composition is produced, when the polyester composition is molten for forming or when a formed product is recycled, and decrease of the surface evenness and abrasion resistance of a film can be prevented. The thermal decomposition temperature is more preferably not lower than 360° C., particularly preferably not lower than 370° C. When such organic polymeric particles have a crosslinking degree defined by the following equation of not less than 10% relative to all organic components forming particles, the dispersion property of the particles when formed into polyester films becomes good, and more preferably not less than 30%, particularly preferably not less than 55%.

Crosslinking degree=[Weight of crosslinking components of raw monomer/Total weight of raw monomer]×100 (%)

Further, in such organic polymeric particles, it is preferred that a strength when deformed by 10% ($S_{10}$) of the particles satisfies the following equation from the viewpoint of running stability, abrasion resistance, strength of surface protrusions and dimensional stability.

$$4.9 \times 10^6 \, Pa \leq S_{10} \leq 2.9 \times 10^8 \, Pa$$

More preferably, the following equation is satisfied.

$$4.9 \times 10^6 \, Pa \leq S_{10} \leq 2.5 \times 10^8 \, Pa$$

Further,

Further, within a range which does not obstruct the advantages according to the present invention, internally formed particles precipitated in a polyester polymerization reaction process, which comprise at least one of an alkali metal and an alkaline earth metal and a residue of a catalyst such as phosphorous, may be used together, or compound oxide particles having a different particle diameter may be used together.

With respect to addition of compound oxide particles to polyester in the present invention, for example, a method for kneading the particles into a molten polyester is possible except a method for adding the particles directly to the polymerization process. Although the timing of the addition in the method for adding the particles directly to the polymerization process is not particularly restricted, the timing is preferably a time before transesterification or a time between the time after esterification and the time before starting of pressure reduction of condensation polymerization. In the method for kneading, both a method for kneading the particles into polyester after drying the particles and a method for directly kneading the particles at a condition of a slurry while reducing pressure may be available.

The polyester composition thus prepared may be blended with other polyester compositions such as a polyester for dilution depending upon uses to be aimed.

The polyester composition according to the present invention can be formed into films, for example, by the following process.

After the pellets of the polyester composition are sufficiently dried, they are immediately supplied to an extruder. The pellets are molten at a temperature of 260 to 350° C., the molten polymer is delivered out from a die in a form of a sheet, and it is cooled and solidified on a casting roll to prepare a non-stretched film. Then, the non-stretched film is preferably biaxially stretched. As the stretching process, a sequential biaxially stretching process or a simultaneous biaxially stretching process can be employed, and further, a film thus biaxially stretched may be stretched again. For example, in order to obtain a sufficiently great elastic modulus as a film for magnetic recording media, it is preferred to set the final stretching area ratio (longitudinal draw ratio×transverse draw ratio) at a stretching area ratio of not less than 6, although it depends upon the composition of polyester.

Further, in order to maintain the heat shrinkage of the film small, it is preferred to conduct a heat treatment at a temperature of 150 to 260° C. for 1 to 60 seconds.

Although the use of the polyester composition according to the present invention is not particularly restricted and it can be used for general formed products, fibers and others, particularly it is suitable to use of base films for magnetic recording media.

A film obtained from the polyester composition according to the present invention may be formed into either a single-layer film or a laminated film. In a case of a laminated film, it is preferred that at least one layer thereof is formed using a film according to the present invention because the abrasion resistance of the film surface and the running ability become good. Further, it is preferred that a film containing the compound oxide particles according to the present invention forms one of the outermost layers of the laminated film from the viewpoint of running ability and dubbing property. As the film laminating method, a known method such as a melt-coextrusion can be used.

For example, when the compound oxide particles and the aforementioned particles A except the compound oxide particles are used together, although the respective particles may be contained in different layers, respectively, it is preferred that the compound oxide particles and the particles A are contained in an identical outermost layer on one surface from the viewpoint of abrasion resistance, running ability and dubbing property. In this case, the thickness "t" of the film layer containing the compound oxide particles preferably satisfies the equation: $0.2Dw \leq t \leq 10Dw$ in the relationship with the volume average particle diameter Dw of the compound oxide particles, from the viewpoint of running ability and surface evenness, more preferably in the range of $0.5Dw \leq t \leq 5Dw$, particularly preferably in the range of $0.5Dw \leq t \leq 3Dw$.

In a case where the compound oxide particles and the particles A are contained in different layers, respectively, the thickness "t" of the film layer containing the compound oxide particles preferably satisfies the equation: $0.2Dw \leq t \leq 10Dw$ in the relationship with the volume average particle diameter Dw of the compound oxide particles, from the viewpoint of running ability and surface evenness, more preferably in the range of $0.5Dw \leq t \leq 5Dw$, particularly preferably in the range of $0.5Dw \leq t \leq 3Dw$. Further, it is preferred that the layer containing particles A exists outside of the film layer containing the compound oxide particles as an outermost layer from the viewpoint of running ability, abrasion resistance and dubbing property. In this case, the thickness of the outermost layer is preferably in the range of 0.005 to 1 μm, more preferably in the range of 0.01 to 0.5 μm, particularly preferably in the range of 0.02 to 0.3 μm, from the viewpoint of abrasion resistance, running ability and surface evenness.

Further, in the film, the number of protrusions on at least one surface is preferably in the range of $2 \times 10^3$ to $5 \times 10^5$, more preferably in the range of $3 \times 10^3$ to $4 \times 10^5$, particularly preferably in the range of $5 \times 10^3$ to $3 \times 10^5$, from the viewpoint of abrasion resistance and running ability.

Furthermore, it is preferred that the laminated film is formed as a three-layer film and both of the outermost layers contain the compound oxide particles from the viewpoint of running ability and dubbing property. In this case, if the central layer and/or the outermost layers contain the aforementioned internally formed particles, particularly the running ability can be improved. Further, it is preferred that a recycle polymer, which is generated in a film manufacturing process, is used for at least a part of the central layer, from the viewpoint of cost down.

Next, the methods for determining and estimating properties in the present invention will be explained.

(A) Properties of particles (A-1) Determination of Ratio of particle diameters, Average particle diameter and Relative standard deviation Particles are added to polyester, after it is cut at a very thin piece having a thickness of 0.2 μm, at least 100 particles are observed by a transmission electron microscope, and the ratio of particle diameters, volume average particle diameter and relative standard deviation are determined from the result observed.

$$\sigma = \left[ \sum_{i=1}^{n} (Di - D)^2 / n \right]^{(1/2)} / D$$

$$D = \sum_{i=1}^{n} Di / n$$

where,

σ: relative standard deviation of particle diameter

D: number average diameter of particles (μm)

Di: particle diameter (μm)

n: number of particles (number)

(A-2) Determination of alkali metal atom

It is determined by atomic absorption method.

(A-3) Determination of silicon atom and aluminium atom

They are determined by fluorescent X-ray spectroscopy.

(A-4) Analysis of crystal structure

It is determined by X-ray diffraction method.

(A-5) Determination of thermal decomposition temperature of particles

A weight loss curve is measured by a thermobalance "TAS-100" produced by Rigaku Denki Corporation in a nitrogen atmosphere at a temperature elevation speed of 10° C./min., and a temperature for causing 10% loss in weight is defined as the thermal decomposition temperature.

(A-6) Determination of strength ($S_{10}$) of particle

Using a fine compression tester "TYPE: MCTM-201" produced by Shimadzu Seisakusyo Corporation, a load is applied to a particle at a loading speed of $1.42 \times 10^{-4}$ N/s to $9.8 \times 10^{-3}$ N/s and a deformation at that time is measured. This measurement is repeated ten times, the $S_{10}$ is calculated from an average value of load P (N) causing 10% deformation of the particle based on the following equation.

$$S_{10} = 2.7 \times 10^{-7} \, P/\pi D w^2$$

Where,

P: average of load causing 10% deformation of particle (N)

Dw: volume average particle diameter (m)

(A-7) Determination of moisture content

After sufficiently washing compound oxide particles with methanol, the particles are centrifuged, and after the particles are vacuum dried by a vacuum dryer at a room temperature for about one day, a moisture content evaporated when the particles are heated up to 300° C. by "TAS-100" produced by Rigaku Denki Corporation in a nitrogen atmosphere at a temperature elevation speed of 10° C. /min. is determined.

(B) Polymer and Film properties (B-1) Index for thermal resistance (ΔIV)

A polymer is vacuum dried at 150° C. for 24 hours. This polymer is maintained at a condition in a nitrogen atmosphere at a temperature of 300° C. for ten minutes, and the difference between intrinsic viscosities before and after the maintaining is defined as the "ΔIV".

Where, the intrinsic viscosity is determined at 25° C. using ortho-chlorophenol as solvent.

(B-2) Surface roughness Ra (μm)

Using a Surfcom surface roughness meter based on JIS-B-0601, a center-line average roughness determined under a condition of a probe diameter of 2 μm, a load of 70 mg, a measurement standard length of 0.25 mm and a cut off of 0.08 mm is employed as the surface roughness Ra.

(B-3) Abrasion resistance

① Determination of Abrasion resistance 1

The film is slit into a tape having a small width (2.54 cm) and wound as a roll of tape. The tape is run at a high speed (3.3 cm/sec.) and brought into contact with a SUS-304 guide roll at a constant tension for a long period of time (length of running: 10 cm, repeated times: 50, winding angle: 90 degrees, tension: 90 g) using a tape running tester "TBT-300" produced by Yokohama System Kenkyusyo Corporation. The abrasion resistance 1 is ranked by the amount of white powder generating on the surface of the guide roll as follows.

Rank A: There is no generation of white powder.

Rank B: There is a small amount of white powder.

Rank C: There is a slightly great amount of white powder.

Rank D: There is a great amount of white powder.

② Determination of Abrasion resistance 2

The same roll of tape and tape running tester as those of determination of abrasion resistance 1 are used and the tape is run on a guide pin (250 m/min., running path: one path, winding angle: 60 degrees, tension: 90 g). At that time, scratches generated on the film surface are observed by a microscope, if the number of scratches having a width of not less than 1 μm are less than 2 per the tape width, the abrasion resistance 2 is determined to be Rank A, and the number of not less than 2 and less than 10 is determined to be Rank B and the number of not less than 10 is determined to be Rank C.

(B-4) Running ability (friction coefficient μk)

The film is slitted to prepare a tape with a width of 1.27 cm. The tape is set in a tape running tester "SFT-700" produced by Yokohama System Kenkyusyo Corporation and is run under a condition of 20° C. and 60% RH, and the initial friction coefficient is determined by the following equation.

$$\mu k = 2/\pi \, \ln(T2/T1)$$

Where, T1 is the entrance side tension and T2 is the exit side tension. The diameter of a guide pin is 6 mmφ, the material of the guide pin is SUS27 (surface roughness: 0.2 S), the winding angle is 90 degrees, and the running speed is 3.3 cm/sec. A case where the friction coefficient obtained in the measurement μk is not more than 0.3 is determined to be "good", and a case of more than 0.3 is determined to be "not good".

(B-5) Number of protrusions on film surface

The height data of the protrusions measured with a two beam and two detector type scanning electron microscope (EMS-3200; produced by Elionics Corporation) and a cross section measuring apparatus (PMS-1; produced by Elionics Corporation) by scanning them along the surface of the film setting the flat portion of the film surface as height: 0 is transferred to an image processor (IBAS-2000; produced by Karlzuis Corporation), and an image of the protrusions on the film surface is reconstructed on the display of the image processor. Then, the highest value among the height data of the respective protrusion portions of a protrusion processed into a binary condition on the display is defined as a height of the protrusion, and this determination is repeated on the respective protrusions. The determination is repeated 500 times changing measuring portions, the data determined to be not less than 20 nm are defined as protrusions, and the number of the protrusions is determined. The magnification of the scanning electron microscope is set in the range of 1000 to 8000 times. As needed, the height data obtained using a photo-interference type three-dimensional surface analyser (TOPO-3D; produced by WYKO Corporation, magnification of objective lens; 40–200 times, use of a high resolution camera is effective) may be read instead of the data of the above-described scanning electron microscope.

(B-6) Thickness of laminated film layer

The ratio of the density of the element originating from the particles contained at the highest density in the film to the density of the carbon in the polyester ($M^+/C^-$) determined by using secondary ion mass spectrum analysis apparatus (SIMS) within the range of a depth of 3000 nm from the film surface is defined as the particle density, and the analysis is carried out along the thickness direction of the film down to the depth of 3000 nm. The particle density in the outermost layer increases as the determination point is far away from the surface because the surface constitutes a boundary surface. In the film according to the present invention, the particle density becomes the maximum at a depth and thereafter decreases again. Based on this particle density curve, a depth, at which the particle density becomes half of the maximum value, is defined as the thickness of the laminated layer (this depth is greater than the depth causing the maximum particle density).

The measuring conditions are as follows.

① Measuring apparatus

Secondary ion mass spectrum analysis apparatus (SIMS); A-DIDA3000 produced by ATOMIKA (Germany)

② Measuring conditions

Primary ion species; $O_2^+$

Primary ion acceleration voltage; 12 kV

Primary ionic current; 200 nA

Raster area; 400 μm□

Analysis area; gate 30%

Degree of vacuum for measurement; $6.0 \times 10^{-9}$ Torr

E-GUN; 0.5 kV–3.0 A

In a case where the particles contained at the highest density within the depth range of 3000 nm from the film surface is organic polymeric particles, because the determination by SIMS is difficult, the thickness of the laminated layer may be determined by measuring the depth profile of the particle density by XPS (X-ray photoelectron spectrum) or IR (infrared spectroscopic analysis) while etching from the surface, and determining in a manner similar to the above-described manner. Further, the thickness also can be determined by observing the cross section of the film with a electron microscope and recognizing the boundary of the layer from the variation state of the particle density or the difference of contrasts due to the difference of polymers.

EXAMPLES

The present invention will be hereunder explained based on Examples, but the present invention is not limited to such Examples.

Example 1

10 parts by weight of compound oxide particles with a composition shown in Table 1 and having a volume average particle diameter of 0.55 μm and an $S_{10}$ of $2.1 \times 10^8$ Pa and 90 parts by weight of ethylene glycol were mixed and treated by stirring by a dissolver at a room temperature for two hours to prepare an ethylene glycol slurry of compound oxide particles (X).

10 parts by weight of alumina particles having a volume average particle diameter of 0.10 μm and a specific surface area of 200 m²/g and 90 parts by weight of ethylene glycol were treated by stirring by a dissolver at a room temperature for two hours to prepare an ethylene glycol slurry of alumina particles (Y).

10 parts by weight of styrene-divinylbenzene copolymer particles (organic particles) having a volume average particle diameter of 0.6 μm, a degree of crosslinkage of 80 wt. %, a thermal decomposition temperature of 390° C. and an $S_{10}$ of $5.9 \times 10^7$ Pa and 90 parts by weight of ethylene glycol were treated by stirring by a dissolver at a room temperature for two hours to prepare an ethylene glycol slurry of styrene-divinylbenzene copolymer particles (Z).

On the other hand, after magnesium acetate was added as a catalyst to dimethyl terephthalate and ethylene glycol to transesterify them, the above-described slurry (X), slurry (Y), slurry (Z) and antimony trioxide prepared as a catalyst were added to the reaction product to transesterify them, and thereafter, trimethyl phosphate was further added to perform condensation polymerization to prepare a polyethylene terephthalate composition. This polymer had a "ΔIV" of 0.07 and a good thermal resistance.

The polyethylene terephthalate composition was melt-extruded at 290° C., and thereafter, the extruded polymer was stretched at a temperature of 90° C. and at draw ratios of 3 times in the longitudinal and transverse directions, respectively. Then, the stretched film was heat treated at 220° C. for 15 seconds to obtain a biaxially oriented polyethylene terephthalate film having a thickness of 15 μm. The film formation was carried out at a good condition without breakage.

When this film was determined, the surface roughness Ra was 0.021 μm, the friction coefficient μk was 0.11 and the abrasion resistance 1 was Rank A, and thus the film had excellent abrasion resistance and running ability. Further, the volume average particle diameter of the compound oxide particles was 0.55 μm, the ratio of long diameter/short diameter of the particles was 1.05 and the relative standard deviation "σ" was 0.11.

Examples 2–6

The kind, average particle diameter and content of the particles contained in the polyethylene terephthalate composition were changed and biaxially oriented polyester films were obtained in a manner similar to that of Example 1. The thermal resistance of the polymer used for film formation was good, and the results of determination of the films obtained are shown in Table 1. These films had good abrasion resistance and running ability.

Example 7

A biaxially oriented film was obtained in a manner similar to that of Example 1 other than a condition where the polyester was polyethylene-2,6-naphthalene dicarboxylate. The result of determination of this film is shown in Table 2. This film was Rank A in both of abrasion resistance 1 and abrasion resistance 2, and had good abrasion resistance and running ability.

Example 8

A polyethylene terephthalate composition (P) was prepared in a manner similar to that of Example 1 other than a condition where two kinds of composite oxide particles and styrene-divinylbenzene copolymer particles were added as particles to be contained.

A polyethylene terephthalate composition (Q) was prepared in a manner similar to that of Example 1 other than a condition where alumina particles were added as particles to be contained.

The composition (Q) was melt-coextruded on the composition (P) to obtain a non-stretched laminated film. At that time, the temperature for the extrusion was 290° C. Then, the film was stretched at a temperature of 90° C. and at draw ratios of 3 times in the longitudinal and transverse directions, respectively, and thereafter, the stretched film was heat treated at 220° C. for 20 seconds to obtain a biaxially oriented laminated film. The thicknesses of the layers (P) and (Q) were 8 μm and 0.5 μm, respectively.

When this film was determined, as shown in Table 2, the surface roughness Ra was 0.021 μm, the abrasion resistance

Example 9

A biaxially oriented film was obtained in a manner similar to that of Example 8 other than a condition where compositions (R) and (S) of polyethylene-2,6-naphthalene dicarboxylate were used as polyester. This film had good abrasion resistance and running ability (Table 2).

Example 10

A composition (T) containing compound oxide particles prepared in a manner similar to that of Example 1 and polyethylene terephthalate (U) which does not contain particles were polymerized.

Layers of the polyethylene terephthalate (U) were melt-coextruded on both surfaces of a central layer of the composition (T) to obtain a non-stretched three-layer laminated film. At that time, the temperature for the extrusion was 290° C. Then, the film was stretched at a temperature of 90° C. and at draw ratios of 3.8 times in the longitudinal and transverse directions, respectively, and thereafter, the stretched film was heat treated at 220° C. for 20 seconds to obtain a biaxially oriented laminated film. The thicknesses of the layers (T) and (U) were 1.5 μm and 8 μm, respectively.

When this film was determined, as shown in Table 2, the film had excellent abrasion resistance and thermal resistance.

Examples 11–13, Comparative Example 3

Biaxially oriented polyester films were obtained in a manner similar to that of Example 1 other than a condition where the composition, particle diameter ratio and crystallinity of aluminum silicate particles were changed (Examples 11–13). Further, in Example 14, a biaxially oriented polyester film was obtained in a manner similar to that of Example 1 using agglomerated aluminum silicate particles. When these films were determined, as shown in Table 3, the films had excellent running ability, abrasion resistance and thermal resistance. In Comparative Example 3, a biaxially oriented film was obtained in a manner similar to that of Example 1 using agglomerated aluminum silicate particles. Although the abrasion resistance was still in the range to be satisfactory for use, the surface roughness tended to become greater, and it was understood that this film was not suitable as a base film for high-density magnetic recording media.

Comparative Examples 1 and 2

The kind, average particle diameter and content of the particles contained were changed and biaxially oriented polyester films were obtained in a manner similar to that of Example 1. The results of determination of the films obtained are shown in Table 3. These films could not satisfy both of abrasion resistance and running ability.

TABLE 1

| | | Example 1 | Example 2 | Example 3 | Example 4 | Example 5 | Example 6 |
|---|---|---|---|---|---|---|---|
| | Kind of chip in chip blend | — | — | — | — | — | — |
| Compound oxide particles | Particle diameter (μm) | 0.55 | 0.21 | 0.32 | 0.32 | 0.55 | 0.55 |
| | Relative standard deviation | 0.11 | 0.11 | 0.12 | 0.12 | 0.10 | 0.10 |
| | Content of particles in film (wt. %) | 0.30 | 0.20 | 0.30 | 0.20 | 0.15 | 0.30 |
| | Particle diameter ratio | 1.05 | 1.08 | 1.10 | 1.05 | 1.05 | 1.09 |
| | Specific surface area (m$^2$/g) | 19.8 | 23.1 | 21.5 | 21.1 | 19.8 | 19.5 |
| | Silicon (wt. %) | 31.8 | 30.1 | 29.3 | 31.1 | 31.8 | 33.0 |
| | Aluminum (wt. %) | 14.1 | 12.1 | 13.5 | 11.8 | 14.1 | 10.5 |
| | Alkali metal (wt. %) | 10.6 | 10.6 | 10.3 | 10.3 | 10.6 | 9.5 |
| | Si/Al (mole ratio) | 2.17 | 2.39 | 2.09 | 2.54 | 2.17 | 3.03 |
| | M/Si (mole ratio) | 0.41 | 0.43 | 0.43 | 0.40 | 0.41 | 0.35 |
| | Moisture content (wt. %) | 13.2 | 10.8 | 12.5 | 11.9 | 13.8 | 13.1 |
| | Kind of seed particles | — | silica | — | silica | — | silica |
| | Particle diameter of seed particles (μm) | — | 0.09 | — | 0.10 | — | 0.09 |
| | Relative standard deviation of particle diameter of seed particles | — | 0.03 | — | 0.08 | — | 0.13 |
| | Crystallinity | amorphous | amorphous | amorphous | amorphous | amorphous | amorphous |
| Particles A together used | Kind of particles | alumina | zirconia | alumina | alumina | alumina | alumina |
| | Particle diameter (μm) | 0.10 | 0.10 | 0.10 | 0.10 | 0.10 | 0.10 |
| | Content of particles (wt. %) | 0.30 | 0.30 | 0.30 | 0.30 | 0.30 | 0.30 |
| Particles B together used | Kind of particles | organic particle 1 | — | organic particle 1 | — | calcium carbonate | — |
| | Particle diameter (μm) | 0.60 | — | 0.45 | — | 0.60 | — |
| | Content of particles (wt .%) | 0.10 | — | 0.10 | — | 0.10 | — |
| Polymer | ΔIV | 0.18 | 0.16 | 0.19 | 0.13 | 0.18 | 0.07 |
| Film properties | Surface roughness Ra (μm) | 0.021 | 0.023 | 0.023 | 0.022 | 0.022 | 0.024 |
| | Friction coefficient μk | 0.11 | 0.12 | 0.12 | 0.13 | 0.12 | 0.13 |
| | Abrasion resistance 1 | A | A | A | A | A | A |
| | Abrasion resistance 2 | B | B | B | B | B | A |
| | Number of protrusions (number/mm$^2$) | 43,000 | 48,000 | 46,000 | 48,000 | 45,000 | 46,000 |

Note: Alkali metal in particles is sodium.

TABLE 2

|  |  | Example 7 | Example 8 | | Example 9 | | Example 10 | |
| --- | --- | --- | --- | --- | --- | --- | --- | --- |
|  | Kind of chip in chip blend | — | composition P | — | composition R | composition S | composition T | composition U |
| Compound oxide particles | Particle diameter (μm) | 0.45 | — | 0.55 | — | 0.55 | 0.40 | — |
|  | Relative standard deviation | 0.11 | — | 0.11 | — | 0.11 | 0.11 | — |
|  | Content of particles in film (wt. %) | 0.20 | — | 0.30 | — | 0.30 | 0.40 | — |
|  | Particle diameter ratio | 1.10 | — | 1.05 | — | 1.05 | 1.05 | — |
|  | Specific surface area (m²/g) | 20.6 | — | 19.8 | — | 19.8 | 22.5 | — |
|  | Silicon (wt. %) | 32.2 | — | 31.8 | — | 31.8 | 32.6 | — |
|  | Aluminium (wt. %) | 11.0 | — | 14.1 | — | 14.1 | 10.7 | — |
|  | Alkali metal (wt. %) | 8.3 | — | 10.6 | — | 10.6 | 9.0 | — |
|  | Si/M (role ratio) | 2.82 | — | 2.17 | — | 2.17 | 2.94 | — |
|  | M/Si (mole ratio) | 0.31 | — | 0.41 | — | 0.41 | 0.34 | — |
|  | Moisture content (wt .%) | 13.5 | — | 13.2 | — | 13.2 | 2.0 | — |
|  | Kind of seed particles | — | — | — | — | — | — | — |
|  | Particle diameter of seed particles (μm) | — | — | — | — | — | — | — |
|  | Relative standard deviation of particle diameter of seed particles | — | — | — | — | — | — | — |
|  | Crystallinity | amorphous | — | amorphous | — | amorphous | amorphous | — |
| Particles A together used | Kind of particles | alumina | alumina | — | alumina | — | alumina | — |
|  | Particle diameter (μm) | 0.10 | 0.10 | — | 0.10 | — | 0.10 | — |
|  | Content of particles (wt. %) | 0.30 | 0.30 | — | 0.30 | — | 0.30 | — |
| Particles B together used | Kind of particles | organic particle 1 | — | organic particle 1 | — | organic particle 1 | — | — |
|  | Particle diameter (μm) | 0.60 | — | 0.60 | — | 0.60 | — | — |
|  | Content of particles (wt. %) | 0.10 | — | 0.10 | — | 0.10 | — | — |
| Polymer | ΔIV | 0.08 | — | 0.18 | — | 0.18 | 0.07 | — |
| Film properties | Surface roughness Ra (μm) | 0.023 | 0.021 | | 0.020 | | 0.023 | |
|  | Friction coefficient μk | 0.14 | 0.12 | | 0.11 | | 0.12 | |
|  | Abrasion resistance 1 | A | A | | A | | A | |
|  | Abrasion resistance 2 | A | B | | B | | A | |
|  | Number of protrusions (number/mm²) | 51,000 | 59,000 | | 56,000 | | 60,000 | |

Note: Alkali metal in particles is sodium.

TABLE 3

|  |  | Example 11 | Example 12 | Example 13 | Comparative Example 3 | Comparative Example 1 | Comparative Example 2 |
| --- | --- | --- | --- | --- | --- | --- | --- |
|  | Kind of chip in chip blend | — | — | — | — | — | — |
| Compound oxide particles | Particle diameter (μm) | 0.45 | 0.50 | 0.45 | 0.50 | 0.32 | 0.32 |
|  | Relative standard deviation | 0.11 | 0.15 | 0.14 | 0.60 | 0.12 | 0.12 |
|  | Content of particles in film (wt. %) | 0.30 | 0.40 | 0.40 | 0.30 | 0.30 | 0.20 |
|  | Particle diameter ratio | 1.05 | 1.45 | 1.20 | 1.40 | 1.11 | 1.32 |
|  | Specific surface area (m²/g) | 25.0 | 27.0 | 35.5 | 45.0 | 21.5 | 21.5 |
|  | Silicon (wt. %) | 41.0 | 33.1 | 32.5 | 33.0 | 63.2 | 31.1 |
|  | Aluminum (wt. %) | 3.9 | 10.3 | 11.2 | 11.5 | 2.1 | 21.8 |
|  | Alkali metal (wt. %) | 3.4 | 9.4 | 8.5 | 9.3 | 0.3 | 0.4 |
|  | Si/Al (mole ratio) | 10.0 | 3.10 | 2.80 | 2.77 | 29.0 | 1.38 |
|  | M/Si (mole ratio) | 0.10 | 0.35 | 0.89 | 0.95 | 0.17 | 0.02 |
|  | Moisture content (wt. %) | 0.2 | 2.3 | 0.8 | 3.0 | 5.4 | 10.5 |
|  | Kind of seed particles | — | — | — | — | — | silica |
|  | Particle diameter of seed particles (μm) | — | — | — | — | — | 0.11 |
|  | Relative standard deviation of particle diameter of seed particles | — | — | — | — | — | 0.08 |
|  | Crystallinity | amorphous | amorphous | amorphous | amorphous | amorphous | amorphous |
| Particles A together used | Kind of particles | alumina | zirconia | alumina | alumina | alumina | alumina |
|  | Particle diameter (μm) | 0.10 | 0.10 | 0.10 | 0.10 | 0.10 | 0.10 |
|  | Content of particles (wt. %) | 0.30 | 0.25 | 0.40 | 0.40 | 0.30 | 0.30 |
| Particles B together used | Kind of particles | — | — | — | calcium carbonate | — | calcium carbonate |
|  | Particle diameter (μm) | — | — | — | 0.50 | — | 0.60 |
|  | Content of particles (wt .%) | — | — | — | 0.05 | — | 0.10 |
| Polymer | ΔIV | 0.09 | 0.08 | 0.10 | 0.10 | 0.04 | 0.25 |
| Film properties | Surface roughness Ra (μm) | 0.025 | 0.025 | 0.024 | 0.028 | 0.023 | 0.028 |
|  | Friction coefficient μk | 0.14 | 0.10 | 0.13 | 0.11 | 0.21 | 0.19 |
|  | Abrasion resistance 1 | B | B | B | B | C | D |
|  | Abrasion resistance 2 | B | B | B | B | C | C |
|  | Number of protrusions (number/mm²) | 45,000 | 46,000 | 50,000 | 52,000 | 36,000 | 29,000 |

Note: Alkali metal in particles is sodium.

Industrial Applications of the Invention

The polyester composition according to the present invention, when formed into products, particularly into films, has excellent surface evenness, running ability and abrasion resistance, and such films are suitable particularly for magnetic recording media and other applications.

We claim:

1. A polyester composition comprising particles of at least one kind, wherein 0.005 to 10% by weight of said polyester composition comprises substantially amorphous compound oxide particles having a volume average particle diameter of 0.005 to 2 μm and composed mainly of silicon (Si), aluminum (Al) and at least one alkali metal (M), wherein the contents of said silicon, aluminum and alkali metal satisfy the following equations (1) to (3):

$$10 \text{ wt. \%} \leq Si \leq 45 \text{ wt. \%} \tag{1},$$

$$3 \text{ wt. \%} \leq Al \leq 30 \text{ wt. \%} \tag{2},$$

$$0.5 \text{ wt. \%} \leq M \leq 20 \text{ wt. \%} \tag{3},$$

and wherein the relative standard deviation "σ" of the particle diameter of said compound oxide particles, as represented by the following equation (4), is not more than 0.3:

$$\sigma = [\Sigma_{i=1}^{n}(Di-D)^2/n]^{(1/2)}/D \tag{4},$$

$$D = \Sigma_{i=1}^{n} Di/n \tag{5},$$

where

σ represents the relative standard deviation of particle diameter,

D represents the number average diameter of particles (μm),

Di represents the particle diameter (μm), and n represents the number of particles.

2. The polyester composition according to claim 1, wherein said compound oxide particles are spherical.

3. The polyester composition according to any of claim 1 or 2, wherein the ratio of a long diameter to a short diameter of said compound oxide particles is in the range of 1 to 1.2.

4. The polyester composition according to any of claim 1 or 2, wherein mole ratio (Si/Al) of silicon atom to aluminium atom in said compound oxide particles is in the range of 0.25 to 10.

5. The polyester composition according to claim 1, wherein the mole ratio (Si/Al) of silicon atom to aluminium atom in said compound oxide particles is in the range of 0.28 to 5.

6. The polyester composition according to claim 1, wherein the mole ratio (Al/M) of aluminium atom to alkali metal atom in said compound oxide particles is in the range of 0.8 to 1.2.

7. The polyester composition according to claim 1, wherein the mole ratio (M/Si) of alkali metal atom to silicon atom in said compound oxide particles is in the range of 0.24 to 0.4.

8. The polyester composition according to claim 1, wherein the alkali metal atom in said compound oxide particles is sodium.

9. The polyester composition according to claim 1, wherein the index for thermal resistance ΔIV is less than 0.15.

10. The polyester composition according to claim 1, wherein the content of an alkaline earth metal in said compound oxide particles is not more than 0.1 mol %.

11. The polyester composition according to claim 1, wherein the moisture content of said compound oxide particles is in the range of 0.1 to 20 wt. %.

12. The polyester composition according to claim 1, wherein said compound oxide particles are prepared by adding a silicate of an alkali metal, ammonium or an organic base, and an aluminum compound soluble to an alkali to an alkali solution and producing colloidal particles therein.

13. The polyester composition according to claim 1, wherein said compound oxide particles are multi-layer particles containing a compound oxide in an outermost layer.

14. The polyester composition according to claim 13, wherein the volume average particle diameter of seed particles present in said multi-layer particles is in the range of 0.001 to 0.5 μm, the relative standard deviation "σ" represented by said equation (4) of the seed particles is not more than 0.5, and the ratio of a long diameter to a short diameter of the seed particles is in the range of 1 to 1.2.

15. The polyester composition according to claim 13, wherein seed particles present in said multi-layer particles are particles selected from the group consisting of silicon oxide, aluminum oxide, zirconium oxide, titanium oxide, tin oxide, antimony oxide, yttrium oxide, cerium oxide, indium oxide and iron oxide particles.

16. The polyester composition according to claim 15, wherein the thickness of said outermost layer containing a compound oxide is in the range of 0.01 to 0.3 μm.

17. The polyester composition according to claim 13, wherein said multi-layer particles are prepared by adding a silicate of an alkali metal, ammonium or an organic base, and an aluminum compound soluble to an alkali to a solution dispersed with seed particles and performing particle growth using said seed particles as cores.

18. The polyester composition according to claim 1, wherein the volume average particle diameter Dw (μm) and a specific surface area S (m$^2$/g) of said compound oxide particles satisfy the following equation (6):

$$S \geq 3.5/Dw \tag{6}.$$

19. The polyester composition according to claim 1, wherein the specific surface area of said compound oxide particles is less than 50 m$^2$/g.

20. The polyester composition according to claim 1, wherein the strength when deformed by 10% ($S_{10}$) of said compound oxide particles satisfies the following equation (7):

$$4.9 \times 10^7 \ Pa \leq S_{10} \leq 3.9 \times 10^8 \ Pa \tag{7}.$$

21. The polyester composition according to claim 1, wherein the refractive index of said compound oxide particles is in the range of 1.4 to 1.6.

22. The polyester composition according to claim 21, wherein the refractive index of said compound oxide particles is in the range of 1.45 to 1.52.

23. The polyester composition according to claim 1, wherein said polyester composition contains particles A of a kind other than said compound oxide particles, and said particles A have a volume average particle diameter of 0.005 to 1 μm which is smaller than that of said compound oxide particles by a value of not less than 0.1 μm, a specific surface area not less than 10 m$^2$/g and Moh's hardness of not less than 6.

24. The polyester composition according to claim 23, wherein said particles A are particles selected from the group consisting of silica, silicon oxide, aluminum oxide, zirconium oxide, titanium oxide, spinel and iron oxide particles.

25. The polyester composition according to claim 1, wherein said polyester composition contains particles B of a kind other than said compound oxide particles at a content of 0.005 to 0.3 wt %, and said particles B have a volume average particle diameter of 0.05 to 2 μm which is different from that of said compound oxide particles by a value of not less than 0.1 μm and a Moh's hardness less than 4.

26. The polyester composition according to claim 25, wherein said particles B are inorganic particles.

27. The polyester composition according to claim 25, wherein said particles B are organic polymeric particles.

28. The polyester composition according to claim 27, wherein the thermal decomposition temperature of said particles B is not lower than 350° C.

29. The polyester composition according to claim 27 or 28, wherein the cross-linkage degree of said particles B is not less than 10 wt. % and the strength when deformed by 10% ($S_{10}$) of said particles B satisfies the following equation (8):

$$4.9\times10^6\ Pa \leq S_{10} \leq 2.9\times10^8\ Pa \tag{8}$$

30. The polyester composition according to claim 1, wherein said polyester composition contains precipitated particles produced in a reaction process other than said compound oxide particles.

31. The polyester composition according to claim 1, wherein a main polyester component of said polyester composition is polyethylene-2,6-naphthalene dicarboxylate.

32. A film comprising a polyester composition according to claim 1.

33. A laminated film having at least one layer of a film according to claim 32.

34. The film according to claim 33, wherein said film is a laminated film having three layers and both outermost layers contain compound oxide particles.

35. The film according to claim 34, wherein a central layer contains precipitated particles.

36. The film according to claim 34, wherein an outermost layer contains precipitated particles.

37. The film according to claim 34, wherein a recycle polymer is used for at least a part of a central layer.

38. A laminated film having a layer of a film according to claim 32 as at least one outermost layer.

39. The film according to claim 32, wherein the volume average particle diameter Dw (μm) of said compound oxide particles and the thickness "t" of the film layer containing said compound oxide particles satisfy the following equation (9):

$$0.2Dw \leq t \leq 10Dw \tag{9}$$

40. The film according to any of claim 32 to 39, wherein the number of protrusions on a surface of the film is in the range of $2\times10^3$ to $5\times10^5$.

41. The film according to claim 32, wherein said film is used for magnetic recording media.

42. A polyester composition comprising particles of at least one kind, wherein 0.005 to 10% by weight of said polyester composition comprises substantially amorphous compound oxide particles having a volume average particle diameter of 0.21–0.55 μm and composed mainly of silicon (Si), aluminum (Al) and at least one alkali metal (M), wherein the contents of said silicon, aluminum and alkali metal satisfy the following equations (1) to (3) and have a molar ratio (M/Si) of 0.1–0.89 and a molar ratio (Si/Al) of 2.09–10.0:

$$29.3\ \text{wt. \%} \leq Si \leq 42\ \text{wt. \%} \tag{1}$$

$$3.9\ \text{wt. \%} \leq Al \leq 14.1\ \text{wt. \%} \tag{2}$$

$$3.4\ \text{wt. \%} \leq M \leq 10.6\ \text{wt. \%} \tag{3}$$

and wherein a relative standard deviation "σ" of the particle diameter of said compound oxide particles, as represented by the following equation (4), is 0.03–0.13:

$$\sigma = (\Sigma_{i=1}^{n}(Di-D)^2/n)^{(1/2)}/D \tag{4}$$

$$D = \Sigma_{i=1}^{n} Di/n \tag{5}$$

where

σ represents the relative standard deviation of particle diameter,

D represents the number average diameter of particles (μm),

Di represents the particle diameter (μm), and n represents the number of particles.

43. A polyester composition comprising particles of at least one kind, wherein 0.005 to 10% by weight of said polyester composition comprises substantially amorphous compound oxide particles having a volume average particle diameter of 0.005 to 2 μm and composed mainly of silicon (Si), aluminum (Al) and at least one alkali metal (M), wherein the contents of said silicon, aluminum and alkali metal satisfy the following equations (1) to (3) and have a molar ratio (M/Si) of 0.24–0.4:

$$10\ \text{wt. \%} \leq Si \leq 45\ \text{wt. \%} \tag{1}$$

$$3\ \text{wt. \%} \leq Al \leq 30\ \text{wt. \%} \tag{2}$$

$$0.5\ \text{wt. \%} \leq M \leq 20\ \text{wt. \%} \tag{3}$$

and wherein a relative standard deviation "σ" of the particle diameter of said compound oxide particles, as represented by the following equation (4), is not more than 0.3:

$$\sigma = (\Sigma_{i=1}^{n}(Di-D)^2/n)^{(1/2)}/D \tag{4}$$

$$D = \Sigma_{1=1}^{n} Di/n \tag{5}$$

where

σ represents the relative standard deviation of particle diameter,

D represents the number average diameter of particles (μm),

Di represents the particle diameter (μm), and n represents the number of particles.

* * * * *

UNITED STATES PATENT AND TRADEMARK OFFICE
CERTIFICATE OF CORRECTION

PATENT NO.  : 6,083,617
DATED       : July 4, 2000
INVENTOR(S) : Masatoshi Aoyama, Hiroji Kojima and Masaru Suzuki It is certified that error appears in the above-identified patent and that said Letters Patent is hereby corrected as shown below:

Column 2,
Line 43, please change "$\sigma = [\Sigma_{i=1}^{n} (Di-D)^2/n]^{(1/2)}/D$" to -- $\sigma = [\sum_{i=1}^{n} (Di-D)^2/n]^{(1/2)}/D$ --; and Line 45, please change "$D = \Sigma_{i-1}^{n} Di/n$" to -- $D = \sum_{i=1}^{n} Di/n$ --.

Column 16,
Line 7, please change "Example 14" to -- Comparative Example 3 --.

Column 19,
Line 28, please change "$\sigma = [\Sigma_{i=1}^{n} (Di-D)^2/n]^{(1/2)}/D$" to -- $\sigma = [\sum_{i=1}^{n} (Di-D)^2/n]^{(1/2)}/D$ --; and Line 29, please change "$D = \Sigma_{i-1}^{n} Di/n$" to -- $D = \sum_{i=1}^{n} Di/n$ --.

Column 22,
Line 19, please change "$\sigma = [\Sigma_{i=1}^{n} (Di-D)^2/n]^{(1/2)}/D$" to -- $\sigma = [\sum_{i=1}^{n} (Di-D)^2/n]^{(1/2)}/D$ --; and Line 21, please change "$D = \Sigma_{i-1}^{n} Di/n$" to -- $D = \sum_{i=1}^{n} Di/n$ --.

Line 52, please change "$\sigma = [\Sigma_{i=1}^{n} (Di-D)^2/n]^{(1/2)}/D$" to -- $\sigma = [\sum_{i=1}^{n} (Di-D)^2/n]^{(1/2)}/D$ --; and Line 53, please change "$D = \Sigma_{i-1}^{n} Di/n$" to -- $D = \sum_{i=1}^{n} Di/n$ --.

Signed and Sealed this

Eighth Day of January, 2002

Attest:

*Attesting Officer*

JAMES E. ROGAN
*Director of the United States Patent and Trademark Office*